United States Patent Office.

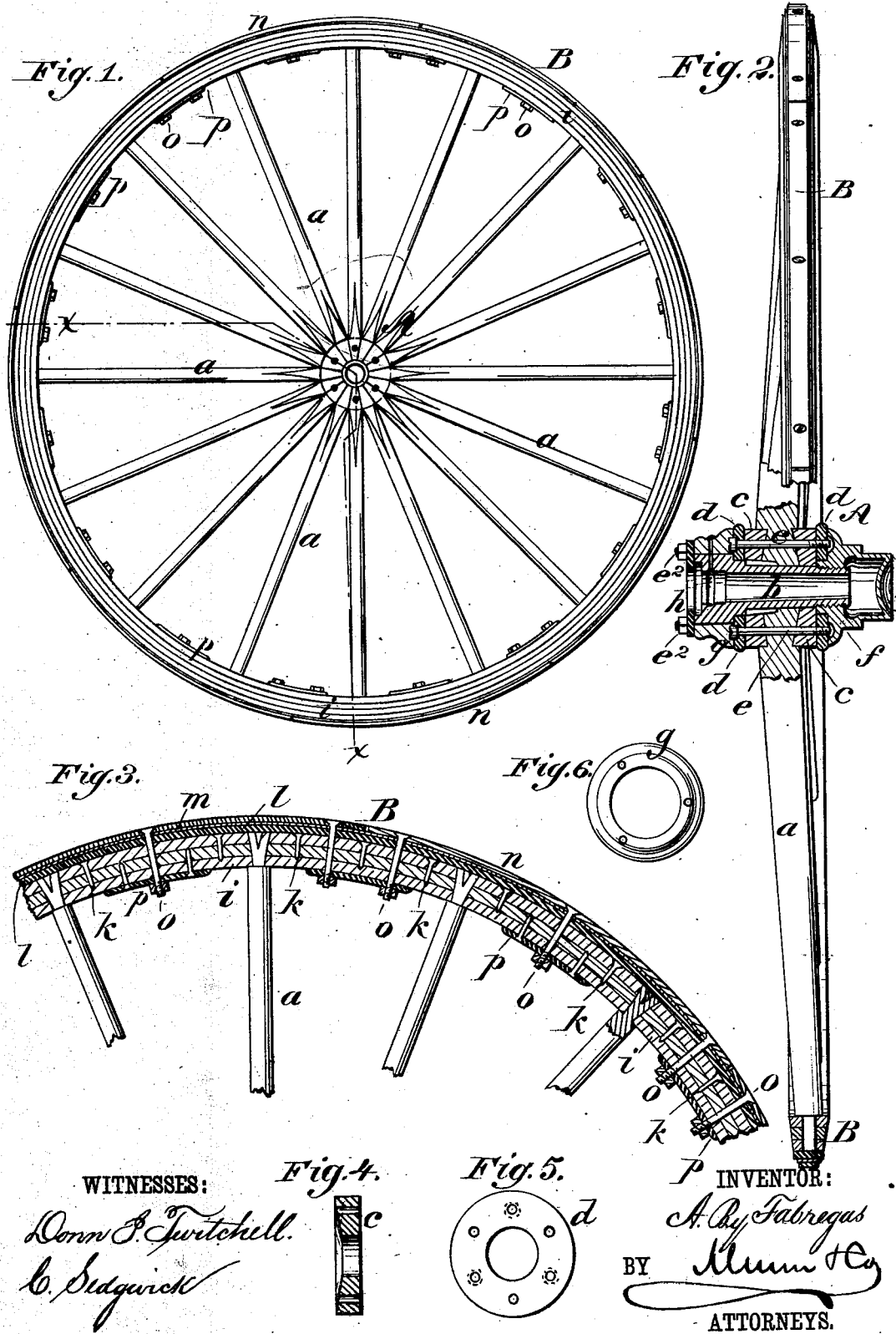

AGUSTIN BLASCO Y FABREGAS, OF MANILA, PHILIPPINE ISLANDS.

VEHICLE-WHEEL.

SPECIFICATION forming part of Letters Patent No. 236,795, dated January 18, 1881.

Application filed December 14, 1880. (Model.) Patented in Spanish Province Philippine Islands April 8, 1879.

*To all whom it may concern:*

Be it known that I, AGUSTIN BLASCO Y FABREGAS, of Manila, in the Philippine Islands, have invented a new and useful Improvement in Vehicle-Wheels, of which the following is a specification.

The object of my invention is to provide an improved vehicle-wheel, whose felly or rim and hub shall be so constructed as to combine great strength and elasticity, while any individual spoke may be readily removed without necessitating the removal of others or the detachment of the tire or felly.

The felly is composed of laminæ of wood tied together by screws, and on the metal tire or iron band that confines such felly are placed strips of leather, which constitute a layer of elastic material. These several strips or pieces of leather are separated at the ends, and on them are laid segmental steel plates, which form the outer peripheral portion of the wheel and take the wear incident to use.

In the drawings, Figure 1 is an elevation of a wheel of my improved construction. Fig. 2 is a transverse section on line $x\ x$ of Fig. 1. Fig. 3 is a longitudinal section of a portion of the felly or rim. Figs. 4, 5, and 6 represent the clamping-rings of the hub.

The spokes $a$ radiate from hub A and carry the felly B. The hub A is formed by the dovetail ends of spokes $a$, wooden concave plates or rings $c\ c$ around the box at opposite sides of the spokes, (shown separately in Fig. 4,) and outer clamping-rings, $d\ d$, (shown separately in Fig. 5,) which parts are tied by short screw-bolts $e$, and long bolts $e^2$, passing through from side to side. In addition a nut, $f$, carrying a dust-cap, is screwed on the outer end of box $b$. A wooden collar, $g$, is placed upon the inner end of the box to give a finished appearance, and to that is secured a ring, $h$. The metal axle-box $b$ has a shoulder which abuts against one of the metal rings $d$.

The continuous felly B is formed of two, three, or more laminæ, $i$, of wood, secured together by screws $k$ entered from the outside. Through this felly the tenons of spokes $a$ pass, and the outer ends of the tenons are spread by wedges, as shown. The felly is surrounded by a continuous iron tire, $l$, that is covered by a layer, $m$, of leather, felt, or other soft material, and around that is an outside tire, $n$, preferably of steel, and made in segments. The tires $l\ n$ are bound together and to the felly by bolts $o$, passed through from the outside, secured by nuts that take against plates $p$ secured on the inner side of the felly.

The steel plates $n$ take the wear incident to friction in practical use of the wheel, and the spaces between their ends allow for the expansion of the metal by heat, and compression of the elastic layer $m$ under pressure. The felly is elastic, yet strong and light, and the butts of the spokes being tied together form the hub proper, which is adapted to receive and be secured to an axle-journal box, as shown. Such hub has great strength and due rigidity, yet possesses more than usual elasticity.

In constructing this wheel I employ an apparatus which forms the subject of separate Letters Patent.

I am aware that the felly of a wheel has been provided with an elastic layer placed between wooden or metal plates, and also that spokes have been constructed with dovetail butts and secured together by means of bolts, and between a fixed shoulder and detachable ring. Such construction and combination of parts I disclaim.

What I do claim is—

1. In a vehicle-wheel, the combination of two or more superposed laminæ or plates of wood forming the felly proper, the continuous metal tire $l$, the segmental leather or other elastic layer $m$, placed next thereto, the separate or segmental steel wearing-pieces $n$, and the tie-bolts passing through said parts, all as shown and described.

2. A vehicle-wheel having its hub proper formed of the butt-ends of spokes having a dovetailed shape, the rings applied on opposite sides of said ends, and tie-bolts passing transversely through all of said parts, as shown and described.

3. In a vehicle-wheel, the combination, with the hub-box and spokes having dovetailed butts, of two wooden concave rings, $c\ c$, the metal rings $d\ d$, metal ring $h$, and tie-bolts $e\ e^2$, passing through all said parts, whereby they are secured rigidly together, as shown and described.

4. The improved vehicle-wheel having the felly B, composed of laminæ of wood, the metal tire, elastic layer $m$, and steel wearing-plates $n$, spokes, and the hub, formed of the dovetailed butts of said spokes, the wooden and metal rings, and tie-bolts, all arranged as shown and described.

AGUSTIN BLASCO Y FABREGAS.

Witnesses:
GEO. D. WALKER,
C. SEDGWICK.